United States Patent
Zarabadi et al.

(10) Patent No.: US 6,393,914 B1
(45) Date of Patent: May 28, 2002

(54) ANGULAR ACCELEROMETER

(75) Inventors: Seyed R. Zarabadi; John C. Christenson; William J. Baney, all of Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/782,708

(22) Filed: Feb. 13, 2001

(51) Int. Cl.[7] ............................................. G01P 15/00
(52) U.S. Cl. ................................................. 73/514.04
(58) Field of Search .................... 73/514.02, 514.04, 73/514.32

(56) References Cited

U.S. PATENT DOCUMENTS

| | | | |
|---|---|---|---|
| 2,912,657 A | 11/1959 | Schaevitz | 336/30 |
| 2,916,279 A | 12/1959 | Stanton | 264/1 |
| 4,435,737 A | 3/1984 | Colton | 361/280 |
| 4,699,006 A | 10/1987 | Boxenhorn | 73/517 |
| 4,736,629 A | 4/1988 | Cole | 73/517 |
| 4,805,456 A | 2/1989 | Howe et al. | 73/517 |
| 4,851,080 A | 7/1989 | Howe et al. | 156/647 |
| 5,092,174 A | 3/1992 | Reidemeister et al. | 73/517 |
| 5,146,389 A | 9/1992 | Ristic et al. | 361/283 |
| 5,226,321 A | 7/1993 | Varnham et al. | 73/505 |
| 5,233,213 A | 8/1993 | Marek | 257/415 |
| 5,249,465 A | 10/1993 | Bennett et al. | 73/510 |
| 5,251,484 A | 10/1993 | Mastache | 73/517 |
| 5,253,526 A | 10/1993 | Omura et al. | 73/517 |
| 5,314,572 A | 5/1994 | Core et al. | 156/643 |
| 5,345,824 A | 9/1994 | Sherman et al. | 73/517 |
| 5,349,858 A | 9/1994 | Yagi et al. | 73/517 |
| 5,388,460 A | 2/1995 | Sakurai et al. | 73/517 |
| 5,417,111 A | 5/1995 | Sherman et al. | 73/517 |
| 5,540,095 A | 7/1996 | Sherman et al. | 73/514 |
| 5,665,915 A | 9/1997 | Kobayashi et al. | 73/514 |
| 5,847,280 A | 12/1998 | Sherman et al. | 73/514 |

FOREIGN PATENT DOCUMENTS

| | | | |
|---|---|---|---|
| RU | 0583397 | 12/1977 | 73/517 A |
| RU | 1035523 | 8/1983 | 73/517 A |
| RU | 1040424 | 9/1983 | 73/517 A |

OTHER PUBLICATIONS

"Rejecting Rotational Disturbances on Small Disk Drives Using Rotational Accelerometers" Daniel Y. Abramovitch, 1996, IFAC World Congress in San Francisco, CA 1996, pp. 1–6.

"Increased Disturbance Rejection in Magnetic Disk Drives by Acceleration Feedforward Control and Parameter Adaption" M.T. White and M. Tomizuka, vol. 5, No. 6, 1997, pp. 741–751.

"Surface Micromachined Angular Accelerometer with Force Feedback" T.J. Brosnihan, A.P. Pisano and R.T. Howe, DSC–vol. 57–2, 1995, IMECE pp. 941–947.

"Embedded Interconnect and Electrical Isolation for High–Aspect Ratio, SOI Inertial Instruments" T.J. Brosnihan, J.M. Bustillo, A.P. Pisano and R.T. Howe, 1997 International Conference on Solid–State Sensors and Actuators, Chicago, Jun. 16–19, 1997, pp. 637–640.

Primary Examiner—Richard A. Moller
(74) Attorney, Agent, or Firm—Jimmy L. Funke (57) ABSTRACT

An angular accelerometer having a substrate, a fixed electrode supported on the substrate and including a first plurality of fixed capacitive plates, and a ring-shaped rotational inertia mass substantially suspended over a cavity and including a plurality of movable capacitive plates arranged to provide a capacitive coupling with the first plurality of fixed capacitive plates. A central member is fixedly attached to the substrate. A plurality of support arms extend between the central member and the ring-shaped mass for supporting the mass relative to the fixed electrode during rotational movement of the mass. The angular accelerometer also includes an input electrically coupled to the fixed electrode for receiving an input signal, and an output coupled to the mass for providing an output signal which varies as a function of the capacitive coupling and is indicative of angular acceleration.

29 Claims, 8 Drawing Sheets

ANGULAR ACCELEROMETER

CROSS-REFERENCE TO RELATED APPLICATIONS

This application is related to application Ser. No. 09/410,712 entitled "ANGULAR ACCELEROMETER," and application Ser. No. 09/410,713 entitled "MEMS STRUCTURE AND MICROFABRICATION PROCESS," both filed on Oct. 1, 1999. The aforementioned related applications are incorporated herein by reference.

TECHNICAL FIELD

The present invention generally relates to rotational acceleration sensors (i.e., angular accelerometers) and, more particularly, to a microfabricated angular accelerometer.

BACKGROUND OF THE INVENTION

Angular accelerometers are employed to measure the second derivative of angular rotation with respect to time. In some machine controlled applications, a measurement of angular acceleration is often needed as a direct input to a control system. For example, in order to prevent against disturbances from external angular acceleration, disk drive read/write heads generally require a sensor for sensing angular acceleration so that the control system associated therewith may compensate for the severe shock and/or vibrations that may have caused the angular acceleration to occur.

One approach to determining angular acceleration employs an angular velocity sensor to sense angular velocity, and differentiates the sensed angular velocity to determine the angular acceleration. The design for an angular velocity sensor is usually complex, and angular velocity sensors are generally expensive to produce. In addition, the acceleration measuring devices employing an angular velocity sensor typically require a differentiator which adds to the complexity and overall cost of the device.

Another approach for determining angular acceleration uses a combination of two linear accelerometers mounted to a rigid body for sensing linear acceleration along two respective perpendicular axes. Generally, linear accelerometers employ a mass suspended from a frame by multiple beams. The mass, beams, and frame act as a spring-mass system, such that the displacement of the mass is proportional to the acceleration applied to the frame. The signal extracted from two linear accelerometers can be used to extract angular acceleration information. Linear accelerometers are readily available and easy to use; however, in order to measure angular acceleration while rejecting linear acceleration, the scale factor, i.e., sensitivity or gain, of the two sensors generally must be matched.

A further approach for an angular accelerometer is disclosed in U.S. Pat. No. 5,251,484, entitled "ROTATIONAL ACCELEROMETER," which employs a circular hub centrally supported on a substrate and connected to radially disposed thin film spoke electrodes that flex in response to angular acceleration. Rotational acceleration measurement is achieved by using a differential, parallel plate capacitive pick-off scheme in which the flexible spoke electrodes at the periphery of the fixed disk rotate between fixed reference electrodes so that an off-center position of moving electrodes results in a measured differential voltage from which the disk motion is determined. The sensing capability for such an accelerometer is generally limited to the amount of movement of the flexible spoke electrodes. This cantilevered design with rotary electrodes generally requires high structural matching to assure predictable gain, phase, and linearity response. The linear and cross-axes sensitivity (gain) is highly dependent on the structural matching. Additionally, separate input and output contacts for each capacitive plate add to the overall complexity and cost of the accelerometer.

The angular accelerometer disclosed in related U.S. application Ser. No. 09/410,712, filed on Oct. 1, 1999, to the Assignee of the present application, discloses an angular accelerometer having a rotational inertial mass suspended over a cavity and connected via tethers at the outer periphery to a substrate. The angular accelerometer disclosed in the aforementioned application achieves enhanced sensitivity over prior known approaches. In some environments, prior known accelerometers may be sensitive to stresses induced by fabrication processing, packaging, handling, and structural asymmetries, and may be susceptible to damage.

Accordingly, conventional accelerometers often suffer from various drawbacks including errors introduced by rotational acceleration orthogonal to the sensing axis and errors introduced by linear acceleration, as well as being susceptible to poor sensitivity and damage. It is therefore desirable to provide for a low cost, easy to make and use, enhanced sensitivity angular accelerometer that eliminates or reduces the drawbacks of prior known accelerometers.

SUMMARY OF THE INVENTION

In accordance with the teachings of the present invention, an angular accelerometer is provided having a substrate, a fixed electrode supported on the substrate and including a first plurality of fixed capacitive plates, and a rotational inertia mass substantially suspended over a cavity and including a plurality of movable capacitive plates arranged to provide a capacitive coupling with the first plurality of fixed capacitive plates. The rotational inertia mass is configured as a substantially annular ring that is rotationally movable relative to the fixed electrode. A fixed central member is attached to the substrate and located substantially at the center of the rotational inertia mass ring. A plurality of support arms extend between the rotational inertia mass and the central member and allow the rotational inertia mass to be biased relative to the fixed electrode during rotational movement of the rotational inertia mass. The angular accelerometer also includes an input electrically coupled to one of the fixed electrodes and the rotational inertia mass for receiving an input signal, and an output coupled to the other of the fixed electrodes and the rotational inertia mass for providing an output signal which varies as a function of the capacitive coupling and is indicative of angular acceleration.

By connecting the rotational inertia mass ring to the fixed central member via the plurality of support arms, the angular accelerometer is less sensitive to stresses induced by fabrication processing, packaging, handling and structural asymmetries. The realization of high gain achieved with the accelerometer enhances immunity to electromagnetic interference (EMI) signals and environmental conditions, such as humidity and temperature. In addition, the angular accelerometer provides high gain for angular accelerations about the sensing axis, while minimizing linear and cross-axis sensitivities.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
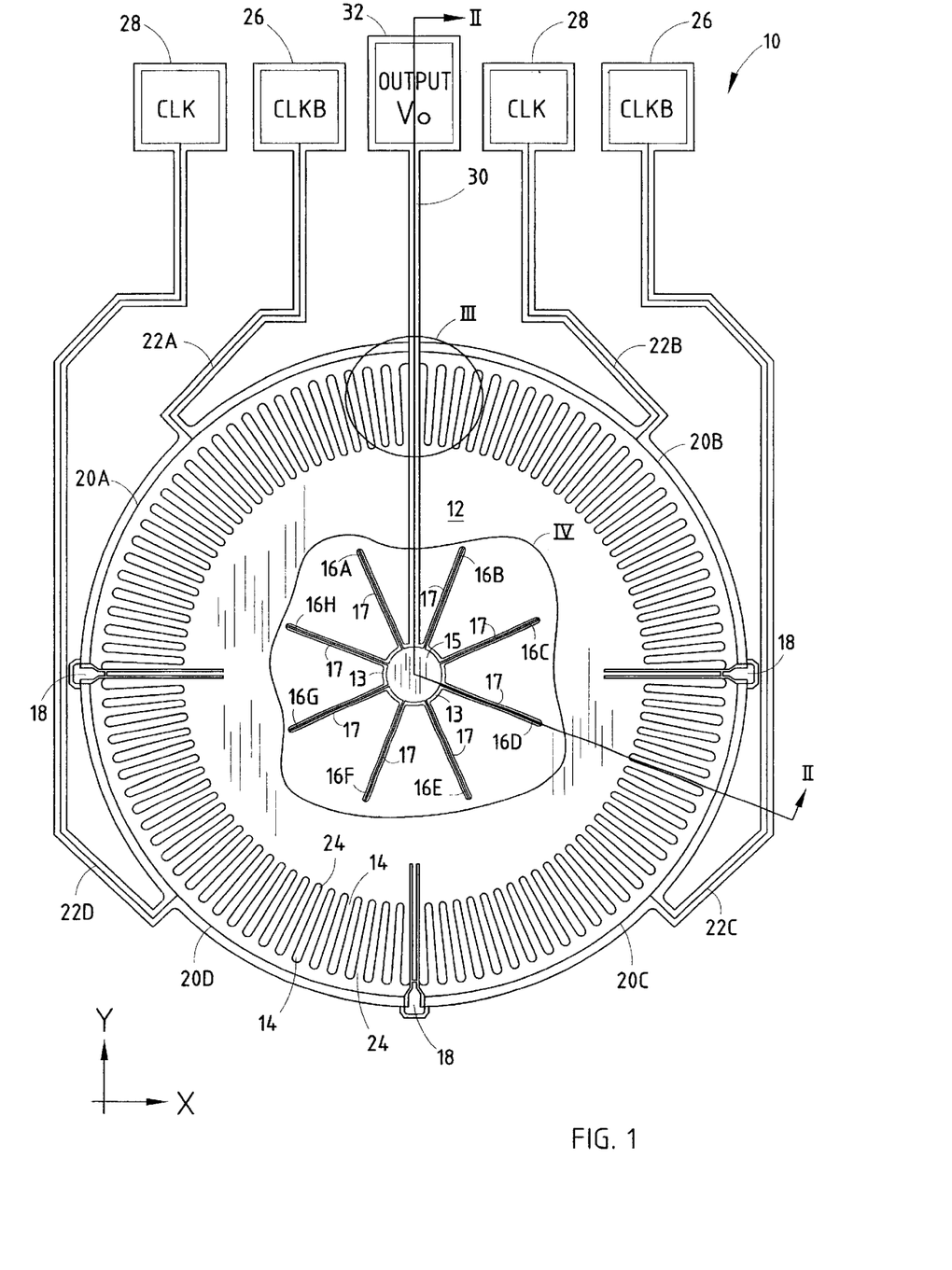
FIG. 1 is a top view of an angular accelerometer formed on a substrate according to a first embodiment of the present invention.
Figures 2, 7:
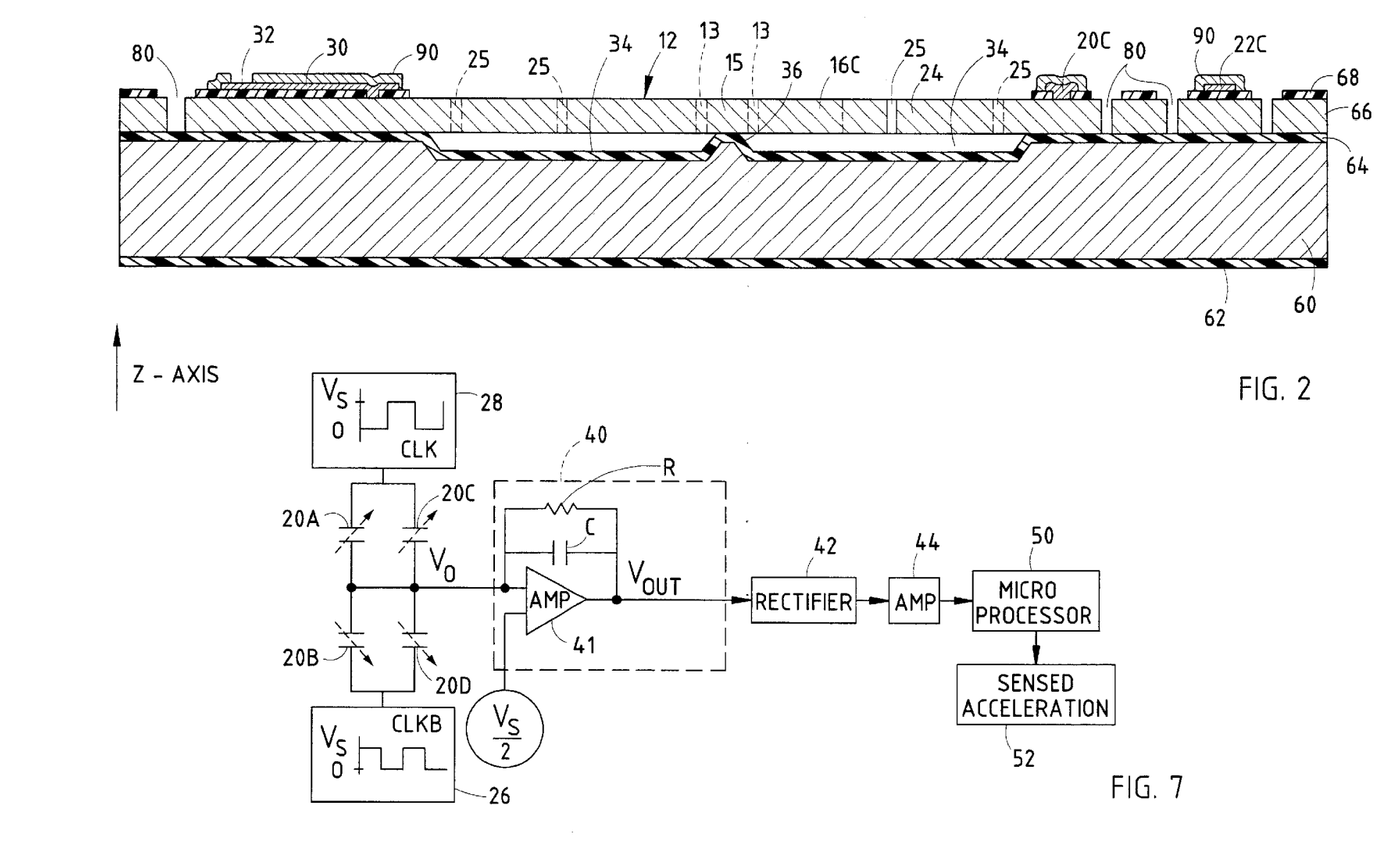
FIG. 2 is a cross-sectional view of the angular accelerometer taken through lines II—II of FIG. 1.
FIG. 7 is a circuit diagram illustrating processing circuitry coupled to the angular accelerometer.

Referring to FIGS. 1 and 2, an angular accelerometer 10 is illustrated according to one embodiment of the present invention for sensing angular acceleration about the Z-axis extending perpendicular to a plane defined by the X-Y axes. The angular accelerometer 10 is preferably fabricated on a single crystal silicon substrate 60 using a trench etching process. The etching process may include etching out a pattern from a doped material suspended over a cavity 34 to form a conductive pattern that is partially suspended over the cavity 34. One example of an etching process that may be used to form the angular accelerometer 10 of the present invention is disclosed in related application Ser. No. 09/410,713, filed on Oct. 1, 1999, and entitled "MEMS STRUCTURE AND MICROFABRICATION PROCESS," which is incorporated herein by reference. While the angular accelerometer 10 is preferably fabricated on a crystal silicon substrate using a trench etching process, it should be appreciated that accelerometer 10 could be fabricated using other known fabrication techniques, such as: an etch and undercut process; a deposition, pattern, and etch process; and an etch and release process, without departing from the teachings of the present invention.

The angular accelerometer 10 includes rotational inertia mass 12, in the shape of an annular ring, suspended over the cavity 34, and a stationary central member 15 fixedly attached to the substrate 60 and centered within an opening centrally provided in the annular ring-shaped mass 12. The rotational inertia mass 12 has a plurality of rigid comb-like conductive fingers 14 extending radially outward from the outer peripheral edge to serve as movable capacitive plates. The rotational inertia mass 12 with comb-like conductive fingers 14, is a movable mass that is rotatable angularly about the Z-axis, when subjected to an angular acceleration about the Z-axis of the angular accelerometer 10. For purposes of discussion herein, the X-Y plane is defined as the plane formed by the X-axis and the Y-axis as oriented in FIG. 1, while the Z-axis is defined as the axis which extends perpendicular to the X-Y plane as shown in FIG. 2.

The rotational inertia mass 12 is shown generally suspended above cavity 34 via eight radial support arms (i.e., tethers) 16A–16H. According to the first embodiment shown and described herein, eight support arms 16A–16H are equi-angularly spaced from one another by forty-five degrees (45°). While eight support arms are shown and described herein in connection with the first embodiment, it should be appreciated that any number of a plurality of support arms may be employed in accordance with the teachings of the present invention, such as four support arms shown herein in connection with second and third embodiments, or other numbers such as twelve, or sixteen support arms. However, it is preferred that the angular accelerometer 10 contains an even number of support arms.

The radial support arms 16A–16H are integrally formed as extensions connecting the fixed central member 15 to the annular ring-shaped mass 12. The eight radial support arms 16A–16H are flexible beams that act as springs which are compliant to bending perpendicular to the longitudinal axis of the beam in the X-Y plane, but are relatively stiff to bending out of the X-Y plane in the direction of the Z-axis. The support arms 16A–16H preferably have a thickness (depth) in the range of 3–200 micrometers and a width in the range of 1–20 micrometers. According to one example, support arms 16A–16H may have a thickness of approximately 30 micrometers as compared to a width of approximately 5 micrometers to provide a sufficient aspect ratio of thickness-to-width to allow for flexibility in the X-Y plane and stiffness in the Z-axis.

In addition, a pair of parallel slots 17 are etched in the rotational inertial mass 12 to form each of the radial support arms 16A–16H. The slots 17 preferably extend through the entire depth of the inertial mass 12 and, in effect, result in slots 17 formed on opposite sides of each support arm. The slots 17 extend from the inner edge of inertial mass 12 radially outward to a location where the corresponding support arm is connected to the inertial mass 12. The slots 17 form air gaps which allow the support arms 16A–16H to be connected at a location further radially outward from the inner edge, thereby providing for an increased effective overall length and greater angular flexibility of the support arms 16A–16H. The eight support arms 16A–16H thereby substantially suspend the rotational inertia mass 12 above the cavity 34 in the X-Y plane, and yet allow angular rotation about the Z-axis when subjected to angular acceleration about the Z-axis. By employing at least two orthogonal pairs of opposing radial support arms, the entire structure is stiff with respect to linear accelerations in the X-Y plane. Yet, the rotational inertia mass 12 is free to rotate about the Z-axis within the constraints of the radial support arms.

Fixed to a thick oxide insulation layer 64 on top of substrate 60 are four fixed electrodes 20A–20D, each having a plurality of fixed capacitive plates 24 interdisposed between adjacent movable capacitive plates 14, to form four banks of variable capacitors. The first fixed electrode 20A has a clock input line 22A for receiving a square wave clock signal CLKB 26. The plurality of fixed capacitive plates 24 provided with the first fixed electrode 20A are interdisposed between adjacent movable capacitive plates 14 of rotational inertia mass 12 for approximately one-quarter rotation (i.e., a ninety degree window) of inertia mass 12, to provide a first bank of capacitors. The second fixed electrode 20B likewise has a plurality of fixed comb-like capacitive plates 24 interdisposed between adjacent movable capacitive plates 14 of inertia mass 12 for approximately one-quarter of its rotation, to provide a second bank of capacitors. The second fixed electrode 20B has a clock input 22B for receiving a square wave clock signal CLK 28. The third fixed electrode 20C also includes a plurality of fixed comb-like capacitive plates 24 for approximately one-quarter of movable capacitive plates 14 of inertia mass 12, to provide a third bank of capacitors, and likewise receives clock signal CLKB 26 via input line 22C. The fourth fixed electrode 20D has a plurality of fixed capacitive plates 24 for approximately the remaining one-quarter of the movable capacitive plates 14 of inertia mass 12, to provide a fourth bank of capacitors, and receives clock signal CLK 28 via clock input line 22D. It should be appreciated that the number of fixed electrodes can be increased to multiples of four, as represented by equation 4×N, where N=1, 2, 3, 4, etc., which may advantageously provide for good matching and cross-axis rejection.

Each of the fixed electrodes 20A–20D are formed near the outer perimeter of the rotational inertia mass 12 extending through an angular rotation of approximately ninety degrees (90°). Adjoining fixed electrodes 20A–20D are dielectrically isolated from one another via isolators 18. Each isolator 18 has one or more slots that serve to provide a dielectric air gap. The fixed electrodes 20A–20D and corresponding plurality of fixed capacitive plates 24 are fixed in place supported on top of insulation layer 64 and substrate 60. Accordingly, the rotational inertia mass 12 and its rigid outer peripheral capacitive plates 14 are able to move relative to fixed capacitive plates 24 in response to a rotational acceleration experienced about the Z-axis.

The rotational inertia mass 12 and movable capacitive plates 14 are electrically conductive and are electrically connected via an output line 30 to output pad 32 for providing an output charge $V_O$. The output charge $V_O$ is processed to generate a voltage which has a voltage level indicative of the angular rotation of the rotational inertia mass 12 relative to the fixed electrodes 20A–20D due to angular acceleration about the Z-axis. Accordingly, by measuring the output charge generated by the output $V_O$ at output pad 32, the angular accelerometer 10 provides an indication of the angular acceleration experienced about the Z-axis.

With particular reference to the cross section shown in FIG. 2, the angular accelerometer 10 includes substrate 60 which serves as the underlying support. Substrate 60 may include a silicon or silicon-based substrate having the thick oxide insulation layer 64 formed on the top surface, and a bottom oxide insulation layer 62 formed on the bottom surface. The substrate 60 may include silicon, or alternate materials such as glass or stainless steel, for example. The substrate 60 and thick oxide insulation layer 64 are configured to provide a cavity 34 below the rotational inertia mass 12. Additionally, substrate 60 and oxide layer 64 form a central pedestal 36 below the fixed central member 15 for purposes of fixing the central member 15 in place relative to the substrate 60. Central pedestal 36 also provides structural support during the fabrication process.

Formed above the substrate 60 and on top of insulation layer 64 is an EPI layer 66. EPI layer 66 is made of a conductive material and is etched to form various components including the rotational inertia mass 12, central member 15, isolating trenches 80, gaps 25, and other elements that support or isolate conductive signal paths. Trenches 80 and air gaps 25 provide physical and electrical isolation between adjacent elements. The EPI layer 66 preferably has a thickness in the range of 3–200 micrometers, and more preferably of approximately 30 micrometers. With the main exception of the rotational inertia mass 12 and central member 15, the EPI layer 66 further includes a field passivation layer 68 disposed on the top surface thereof. The conductive signal paths of electrodes 20A–20D, lines 22A–22D, and data line 30 are formed on top of the dielectric field passivation layer 68 as shown to provide signal transmission paths. In addition, a metal passivation layer 90 is formed over each of these signal paths.

It should be appreciated that the angular accelerometer 10 may be formed by disposing the oxide insulation layer 64, EPI layer 66, and insulation field passivation layer 68 on top of substrate 60. Prior to the etching process, the central pedestal 36 provides structural support for EPI layer 66 to allow the central mass 15 to be fixedly provided on top thereof. By providing a central pedestal 36, the structural integrity of the accelerometer 10 is enhanced during the fabrication process. After the etching process, the central pedestal 36 supports the central member 15 which, in turn, supports the rotational inertia mass 12 via support arms 16A–16H. By supporting the EPI layer 66 in the central region during the manufacturing process, the maximum stress experienced is greatly reduced. This allows the use of larger cavity sizes for a given thickness of EPI layer 66, resulting in greater sensitivity and signal-to-noise ratio.

Figure 3:
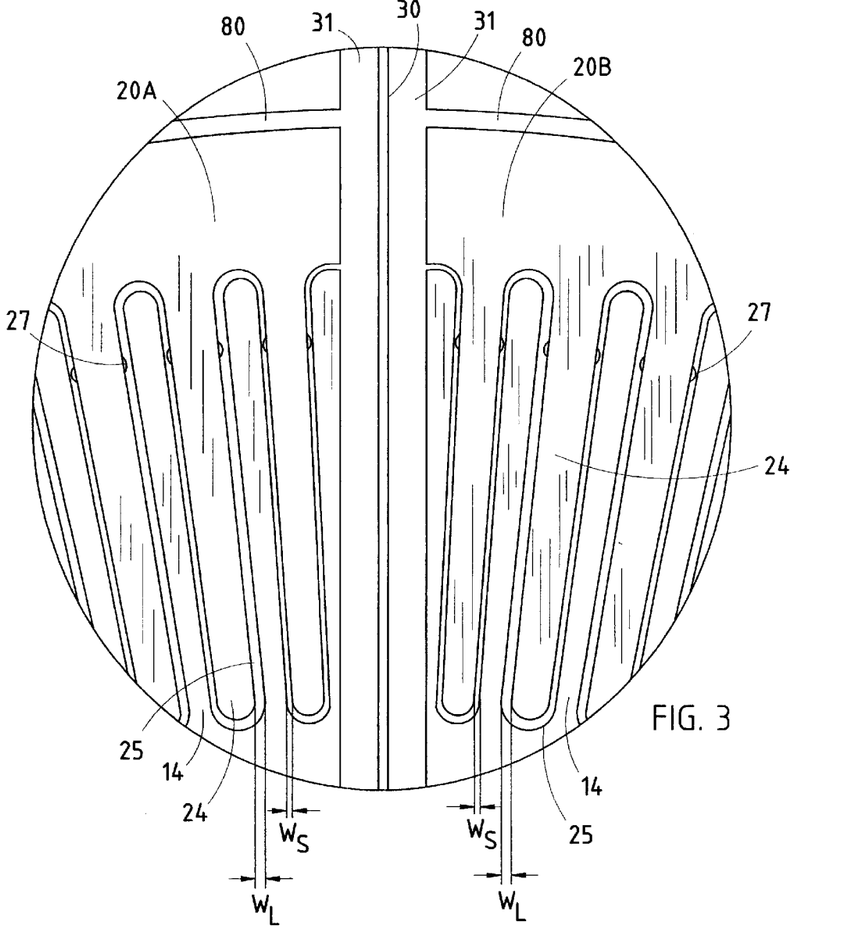
FIG. 3 is an enlarged view of section III of FIG. 1.

Referring to FIG. 3, a portion of the angular accelerometer 10 is further illustrated in greater detail. Data line 30 extends within a pair of parallel radial slots 31 formed through the entire depth of rotational inertia mass 12 to provide an electrical path between the central member 15 and output pad 32. The slots 31 provide dielectric isolation between the data line 30 and rotational inertia mass 12, as well as between adjacent fixed electrodes 20A and 20B, while allowing the rotational inertia mass 12 to rotate within limits. Trenches 80 isolate the fixed electrodes from the outer surrounding elements. The fixed capacitive plates 24 are interdisposed between adjacent movable capacitive plates 14 and separated one from another via an air gap 25. The air gap 25 between capacitive plates 14 and 24 allows for movable capacitive plates 14 to move relative to the fixed capacitive plates 24. Each of the movable capacitive plates 14 has a very small mass as compared to the rotational inertia mass 12, and are rigid to prevent rotary movement relative to rotational mass 12. Additionally, the movable and fixed capacitive plates 14 and 24, respectively, each has a thickness equal to the thickness of the EPI layer 66. Because total change in capacitance is proportional to the thickness of the capacitive plates 14 and 24, the signal-to-noise ratio is enhanced with enlarged thickness.

The air gap 25 between capacitive plates 14 and 24 is greater on the one side of plate 14 as compared to the opposite side. For example, on the bank of capacitors formed by fixed electrode 20B, the width $W_L$ of air gap 25 between capacitive plates 14 and 24 is approximately twice the width $W_S$ of the air gap.

The air gap 25 between adjacent pairs of capacitive plates 14 and 24 is configured substantially the same for each of the fixed capacitive plates 24 connected to the fixed electrode. However, for adjacent fixed electrodes 20A and 20B, the orientation of the conductive plates 14 and 24 is switched in that the larger air gap width $W_L$ and smaller gap width $W_S$ of air gap 25 is on the opposite side as compared to the adjacent fixed electrodes. For example, the fixed capacitive plates 24 on fixed electrode 20A are separated from movable capacitive plates 14 by an air gap 25 of width $W_L$ twice as wide on the left side of capacitor plates 14 as the width $W_S$ on the right side of capacitor plates 14, while fixed electrode 20B is configured with a larger air gap width $W_L$ on the right side of plate 14 as compared to its left side.

Additionally, each of the fixed capacitive plates 24 has a pair of enlarged motion stop beads 27 for limiting the relative movement between capacitive plates 14 and 24, in the event excessive angular acceleration is experienced. The motion stop beads 27 can be formed on either or both of the movable and fixed capacitive plates 14 and 24, respectively.

The angular accelerometer 10 is shown and described in connection with four banks of variable capacitors formed by capacitive plates 14 and 24. The capacitive plates 24 associated with fixed electrodes 20A and 20C have a certain positive-to-negative orientation with respect to movable capacitive plates 14. In contrast, the positive-to-negative orientation between capacitive plates 14 and 24 for the fixed electrodes 20B and 20D are arranged oppositely. By alternating the orientation of the plurality of the four banks of capacitors and the four equi-angular sections as disclosed, the angular accelerometer 10 of the present invention essentially nulls out any cross-axis acceleration and linear acceleration, and allows for angular acceleration to be sensed about the Z-axis. Further, by employing a plurality of fixed capacitive plates 24 commonly connected on fixed electrodes 20A–20D, a reduced number of signal input and output lines is achieved.

Figure 4:
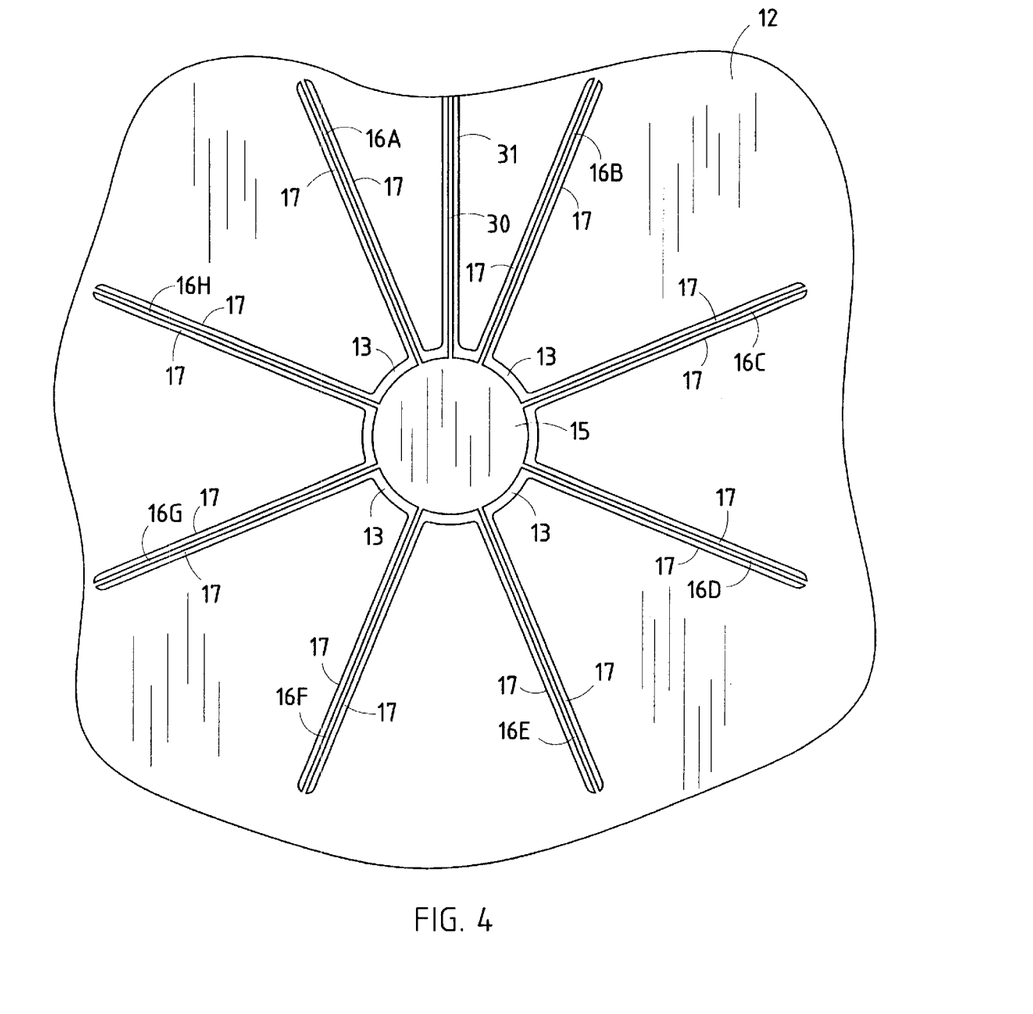
FIG. 4 is an enlarged view of section IV of FIG. 1.

Referring to FIG. 4, an enlarged central portion of the angular accelerometer 10 is illustrated therein in greater detail. Each of radial support arms 16A–16H is formed as a continuous conductive line which extends from the central member 15 to the rotational inertia mass 12 at a location displaced radially outward from the central member 15. Support arms 16A–16H each provide a tether connection between central member 15 and rotational inertia mass 12. Each of support arms 16A–16H is formed of a continuous conductive signal line which, in addition to physically supporting the rotational inertia mass 12, also transmits electrical signals. Support arms 16A–16H are formed by etching to remove material to form the bordering slots 17. Support arms 16A–16H flex within slots 17 to allow movement of the rotational inertia mass 12 relative to the central member 15. Accordingly, support arms 16A–16H provide rigid vertical support in the Z-axis while allowing for angular rotation about the vertical Z-axis.

The central member 15 is separated from the inner circular edge of ring-shaped rotational inertia mass 12 via air gap 13. Air gap 13 is formed as a set of arc-shaped slots between support arms 16 and data line 30 by etching away material from the EPI layer forming mass 12 and central member 15 through the complete depth to form a set of segmented circular slots having a width of preferably at least the width $W_S$. According to one example, air gap 13 has a width of approximately five microns. The air gap 13 has a width sufficient large to allow the rotational inertia mass 12 to rotate relative to the central member 15 without interference, yet is small enough to allow for a large surface area of the ring-shaped inertia mass 12.

Figure 5:
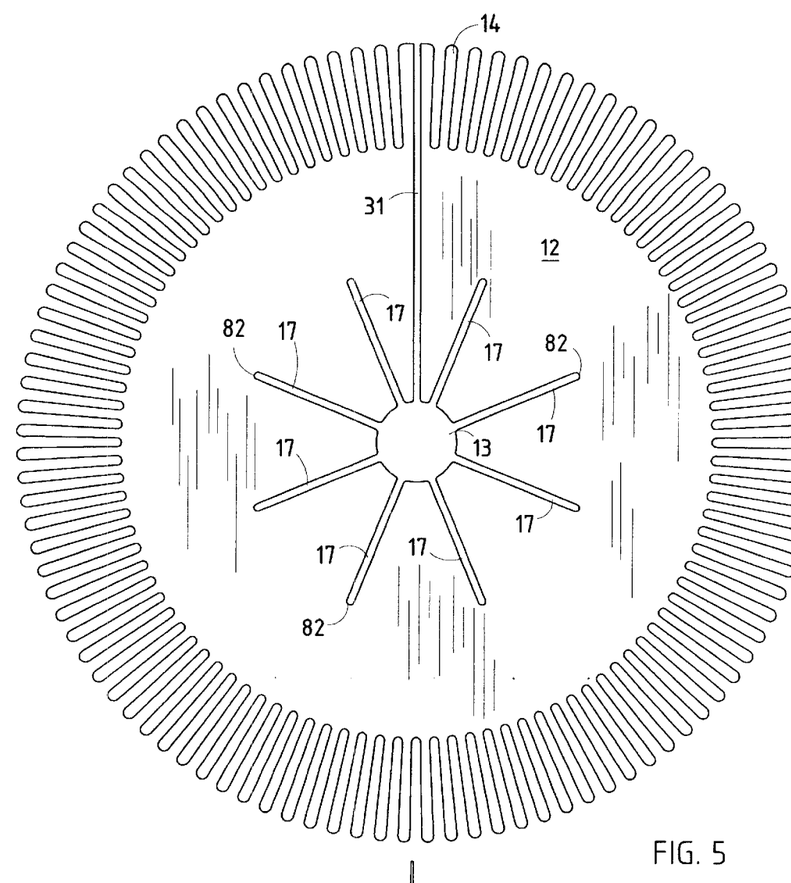
FIG. 5 is a top view of the annular ring inertial mass shown removed from the angular accelerometer.

The rotational inertia mass 12 is further shown in FIG. 5, with the support arms 16A–16H, central member 15 and data line 30 removed. Rotational inertia mass 12 includes slots 31, shown as a single slot with data line 30 removed, formed through the entire depth and extending from the central opening 13 to the outer perimeter for defining an opening in which the data line 30 is disposed. In addition, eight radial slots 17 extend from the central opening 13 to a location radially outward from the center for providing an opening within which the support arms 16A–16H are located and capable of flexing to suspend the rotational inertial mass 12. The rotational inertia mass 12 is ring-shaped in that the central region has a circular opening to receive central member 15 and air gap 13.

Figure 6:
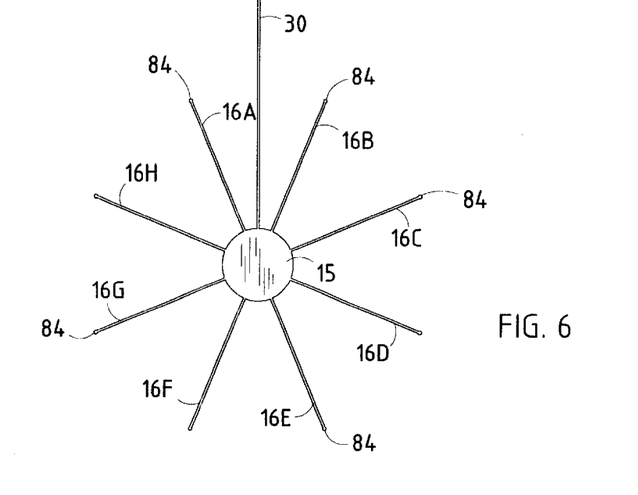
FIG. 6 is a top view of the center member, support arms, and data line shown removed from the angular accelerometer.

The radial support arms 16A–16H, central member 15, and data line 30 are further illustrated in FIG. 6, removed from the rotational inertia mass 12. As can be seen in FIGS. 5 and 6, the central member 15, and support arms 16A–16H fit within the slot 13, and slots 17 and 31, respectively of the rotational inertia mass 12. The outer radial tip 84 of each of support arms 16A–16H attaches at location 82 shown in FIG. 5.

Referring to FIG. 7, the fixed electrodes 20A–20D are generally shown receiving clock signals CLKB 26 and CLK 28 and are connected to processing circuitry. Clock signals CLKB 26 and CLK 28 are rectangular, e.g., square, wave generated signals that have alternating voltage levels of $V_S$ and zero volts. Clock signal CLKB 26 is one hundred eighty degrees (180°) out of phase, i.e., inverse, as compared to clock CLK 28, and therefore provides an opposite phase rectangular waveform. The processing circuitry includes a charge-to-voltage buffer circuit 40 that receives the output charge $V_O$ and generates a voltage signal $V_{OUT}$. Circuit 40 includes a resistor R, a capacitor C, and an amplifier 41. The amplifier 41 receives a signal $$\frac{V_s}{2}.$$

Connected to the output of buffer circuit 40 is a rectifier 42 for rectifying the buffered output and an amplifier 44 for amplifying the rectified signal. A microprocessor 50 receives the amplified signal from amplifier 44 and produces an angular acceleration value 52. The angular acceleration value 52 is computed in proportion to the magnitude of the sensed output charge $V_O$.

Figure 8:
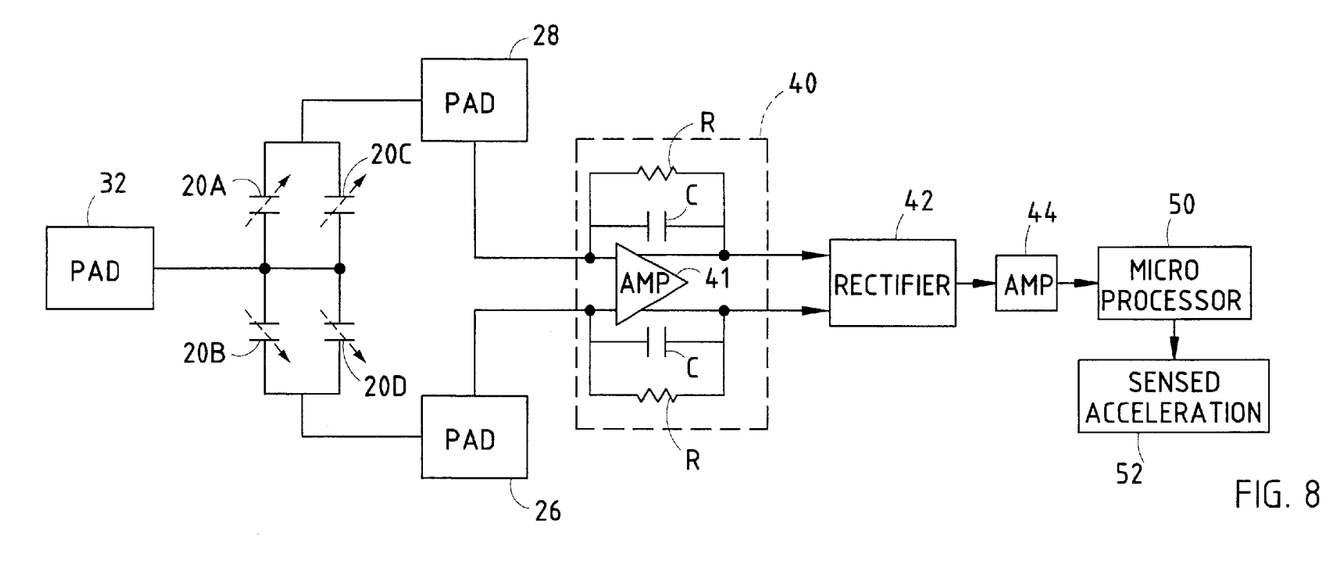
FIG. 8 is a circuit diagram illustrating processing circuitry coupled to an angular accelerometer according to an alternate embodiment.

The inputs and output for the angular accelerometer 10 can otherwise be provided as shown in FIG. 8, according to an alternate embodiment of the present invention. In this alternate embodiment, the output pad 32 can be used as a clock input, and the input pads 26 and 28 can be used as a differential output. The use of differential output pick-offs may improve EMI rejection. In this alternate embodiment, a single-ended signal is applied to the central member via pad 32. Differential outputs are produced at pads 26 and 28 in response to sensing angular acceleration. The differential outputs provide a differential charge that is converted to a differential voltage via charge-to-voltage buffer circuit 40. The differential voltage is processed via rectifier 42 to generate a single-ended voltage which is further processed to extract the acceleration measurement.

In operation, the angular accelerometer 10 provides a measurement of the angular acceleration about the Z-axis, while not responding to cross-angular accelerations and linear accelerations. In doing so, the rotational inertia mass 12, when subjected to an angular acceleration about the Z-axis, rotates about the Z-axis relative to the fixed electrodes 20A–20D and within the restraining limits of the support arms 16A–16H. If the rotational inertia mass 12 is rotated in a positive direction about the Z-axis, the opposing banks of variable capacitors formed by fixed electrodes 20A and 20C increase in capacitance, while the opposing banks of variable capacitors formed by electrodes 20B and 20D decrease in value, or vice versa. The change in capacitance provides for a voltage output signal $V_O$ is indicative of the angular acceleration experienced. Since the support arms 16A–16H are integrally formed within slots 17 in the rotational inertia mass 12 and attached to the central member 15, susceptibility to damage by external shock is thus reduced.

Figure 9:
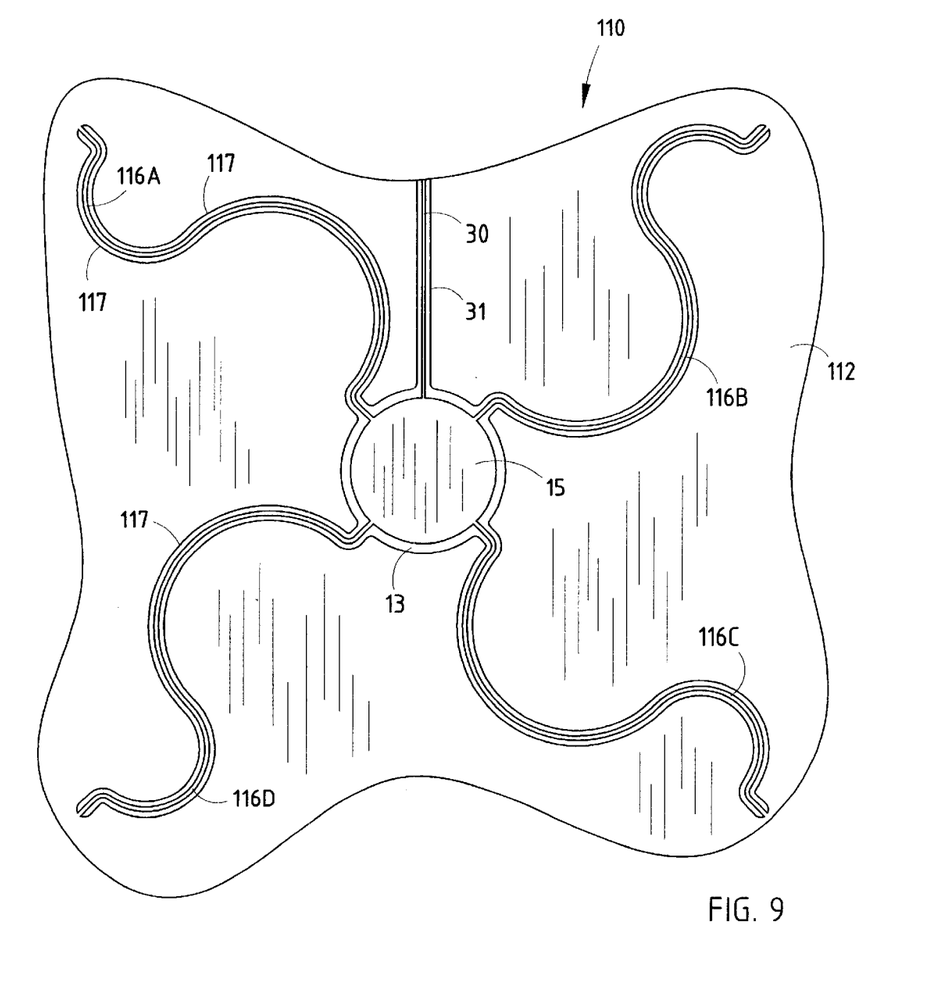
FIG. 9 is a top view of the central section of an angular accelerometer according to a second embodiment of the present invention.

Referring to FIG. 9, an enlarged central portion of an angular accelerometer 110 is shown according to a second embodiment of the present invention. According to the second embodiment, four S-shaped support arms 116A–116D are shown connecting a rotational inertia mass 112 to the central member 15. Each of S-shaped support arms 116A–116D are formed within slots 117 provided in the rotational inertia mass 12 on opposite sides of support arms 116A–116D. Each of the S-shaped support arms 116A–116D are curved having two arc-shaped sections with two radii of curvature, respectively. According to one embodiment, the two radii of curvature of the two arc-shaped sections may be of different magnitudes, such as is shown. According to another example, the two radii of curvature may be equal. The S-shaped support arms 116A–116D allow for larger support arm line-width to achieve a more rugged acceleration sensor, and yet still maintain a large main rotation axis gain, in contrast to the linear support arms 16A–16D as discussed above.

Figure 10:
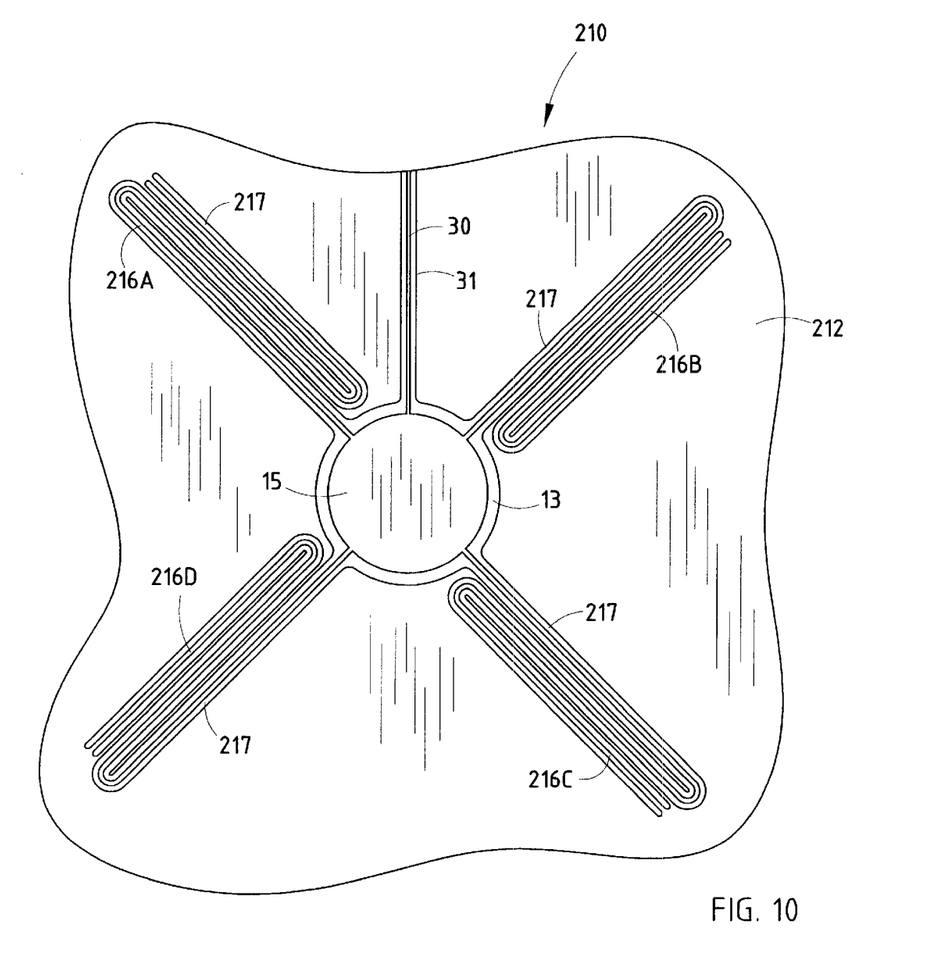
FIG. 10 is a top view of the central section of an angular accelerometer according to a third embodiment of the present invention.

Referring to FIG. 10, an enlarged central view of an angular accelerometer 210 is shown according to a third embodiment of the present invention. According to the third embodiment, four folded beams 216A–216D are provided for attaching a rotational inertia mass 212 to the central member 15. Each of the folded beams 216A–216D includes three radial extending elements folded back upon each other and disposed within a pair of parallel slots 217 to provide an enlarged effective length for connecting the rotational inertia mass 212 to the central member 15 and allowing rotational movement of mass 212 upon experiencing angular acceleration.

By connecting the rotational inertia mass ring to the fixed central member via the plurality of support members, the angular accelerometer is less sensitive to stresses induced by fabrication processing, packaging, handling and structural asymmetries. The realization of high gain enhances immunity to electromagnetic interference (EMI) signals and environmental conditions such as humidity and temperature. In addition, the angular accelerometer provides high gain for angular accelerations about the sensing axis, while minimizing linear and cross-axis sensitivities.

The angular accelerometer 10, 110, and 210 of the present invention is particularly well-suited for use in a disk drive system to sense angular accelerometer of the disk head assembly of the drive, so that the disk drive system may compensate for the angular acceleration to the thereby null out any adverse affects. However, it should be appreciated that the angular accelerometer 10, 110, and 210 may be used in various other applications.

In addition, the angular accelerometer 10 of the present invention may further include an on-chip DRIE (deep reactive ion etch) etch characterization test resistor for allowing testability at the die or wafer level. The incorporation of an on-chip DRIE etch characterization test resistor on a chip is disclosed in co-pending U.S. application Ser. No. 09/411, 339, filed on Oct. 1, 1999, and entitled "METHOD AND APPARATUS FOR ELECTRICALLY TESTING AND CHARACTERIZING FORMATION OF MICROELECTRONIC FEATURES," the disclosure of which is incorporated herein by reference. The use of an on-chip DRIE etch characterization test resistor allows the individual silicon to be tested, allows for detailed wafer maps of DRIE etched wafers to be made as a diagnostic tool for determining the condition of the etch tool, and allows for die-by-die testing.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An angular accelerometer comprising:
   a substrate;
   a fixed electrode supported on the substrate and including a first plurality of fixed capacitive plates;
   a rotational inertia mass substantially suspended over a cavity and including a plurality of movable capacitive plates arranged to provide a capacitive coupling with said first plurality of fixed capacitive plates, said rotational inertia mass configured as a substantially annular ring and rotationally movable relative to said fixed electrode;
   a central member fixed to said substrate and located substantially in the center of said rotational inertia mass;
   a plurality of support arms extending between said central member and said rotational inertia mass for supporting said rotational inertia mass relative to said fixed electrode and allowing rotational movement of the rotational inertia mass upon experiencing an angular acceleration;
   an input electrically coupled to one of the fixed electrode and the rotational inertia mass for receiving an input signal; and
   an output electrically coupled to the other of the fixed electrode and the rotational inertia mass for providing an output signal which varies as a function of the capacitive coupling and is indicative of angular acceleration.

2. The angular accelerometer as defined in claim 1, wherein each of said plurality of support arms comprises a radial extending arm.

3. The angular accelerometer as defined in claim 1, wherein each of said plurality of support arms comprises a curved arm.

4. The angular accelerometer as defined in claim 3, wherein said curved arm is substantially S-shaped.

5. The angular accelerometer as defined in claim 1, wherein each of said plurality of support arms comprises a folded arm.

6. The angular accelerometer as defined in claim 1, wherein said plurality of support arms are substantially equi-angularly located.

7. The angular accelerometer as defined in claim 1, wherein said rotational inertia mass is substantially centrally located, and said first fixed electrode is radially displaced from said rotational inertia mass.

8. The angular accelerometer as defined in claim 1, wherein said substrate comprises a silicon substrate.

9. The angular accelerometer as defined in claim 8, wherein said angular accelerometer is fabricated by a trench etching process.

10. The angular accelerometer as defined in claim 1, wherein said plurality of support arms comprises at least four equi-angular located arms.

11. The angular accelerometer as defined in claim 1, wherein each of said plurality of support arms are flexible so as to bend during angular acceleration about one axis, yet rigid to resist bending due to other accelerations about other axes.

12. The angular accelerometer as defined in claim 1, wherein an input signal is applied to said rotational inertia mass and a differential output signal is produced by the fixed capacitive plates.

13. An angular accelerometer comprising:
   a first bank of variable capacitors formed of a first plurality of fixed capacitive plates and a first plurality of movable capacitive plates;

a second bank of variable capacitors formed of a second plurality of fixed capacitive plates and a second plurality of movable capacitive plates;

a rotational inertia mass configured as a ring that is rotatable in response to angular acceleration and is electrically coupled to said first and second plurality of movable capacitive plates and arranged so that said first and second movable capacitive plates form capacitive couplings with said first and second plurality of fixed capacitive plates;

a central member fixed to said substrate and centrally located within said rotational inertia mass and separated therefrom;

a plurality of support arms extending between said central mass and said rotational inertia mass for supporting said rotational inertia mass and movable capacitive plates relative to said first and second fixed capacitive plates and allowing rotational movement of the rotational inertia mass upon experiencing an angular acceleration;

a first input electrically coupled to said first plurality of fixed capacitive plates;

a second input electrically coupled to said second plurality of fixed capacitive plates; and an output electrically coupled to said plurality of movable capacitive plates for sensing an output signal indicative of angular acceleration in response to rotation of said rotational inertia mass.

14. The angular accelerometer as defined in claim 13, wherein each of said plurality of support arms comprises a radial extending arm.

15. The angular accelerometer as defined in claim 13, wherein each of said plurality of support arms comprises a curved arm.

16. The angular accelerometer as defined in claim 15, wherein said curved arm is substantially S-shaped.

17. The angular accelerometer as defined in claim 13, wherein each of said plurality of support arms comprises a folded arm.

18. The angular accelerometer as defined in claim 13, wherein said plurality of support arms are substantially equi-angularly located.

19. The angular accelerometer as defined in claim 13, wherein said rotational inertia mass is substantially centrally located, and said first and second plurality of movable capacitive plates are radially extended from said rotational inertia mass.

20. The angular accelerometer as defined in claim 13, wherein said substrate comprises a silicon substrate.

21. The angular accelerometer as defined in claim 20, wherein said angular accelerometer is fabricated by a trench etching process.

22. The angular accelerometer as defined in claim 13, wherein said plurality of support arms comprises at least four equi-angular located arms.

23. The angular accelerometer as defined in claim 13, wherein each of said support arms are flexible so as to bend during angular acceleration about one axis, yet rigid to resist bending due to acceleration about other axes.

24. A micromachined angular accelerometer comprising:

a substrate;

a fixed electrode supported on the substrate and including a first plurality of fixed capacitive plates;

a rotational ring having a central opening and including a plurality of movable capacitive plates at the outer perimeter arranged to provide a capacitive coupling with the first plurality of fixed capacitive plates, said rotational ring being suspended over a cavity and rotationally movable relative to said fixed electrode;

a central member fixed to said substrate and located within the central opening of the ring;

a plurality of support arms extending between said central member and said rotational ring for supporting said rotational ring relative to said fixed electrode and allowing rotational movement of the rotational ring upon experiencing an angular acceleration;

an input electrically coupled to one of the fixed electrodes and the rotational ring for receiving an input signal; and an output electrically coupled to the other of the fixed electrode and the rotational ring for providing an output signal which varies as a function of the capacitive coupling and is indicative of angular acceleration.

25. The angular accelerometer as defined in claim 24, wherein each of said plurality of support arms comprises a radial extending arm integrally extending between said rotational ring and said central member, and wherein said radial extending arm is formed by removing material on opposite sides of said radial extending arm.

26. The angular accelerometer as defined in claim 25, wherein each of said plurality of support arms comprises a curved arm.

27. The angular accelerometer as defined in claim 26, wherein said curved arm is substantially S-shaped.

28. The angular accelerometer as defined in claim 25, wherein each of said plurality of support arms comprises a folded arm.

29. The angular accelerometer as defined in claim 24, wherein each of said plurality of support arms comprises two pairs of oppositely opposed support arms, wherein said two pairs are arranged approximately ninety degrees relative to one another.

* * * * *